(12) United States Patent
Porter et al.

(10) Patent No.: US 7,050,096 B2
(45) Date of Patent: May 23, 2006

(54) REAL-TIME IMAGE TRANSFER BY SELECTIVE FRAME DROPPING BETWEEN A CAMERA AND HOST COMPUTER

(75) Inventors: Gary Porter, Weston-Super-Mare (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 803 days.

(21) Appl. No.: 10/108,982

(22) Filed: Mar. 29, 2002

(65) Prior Publication Data
US 2003/0184662 A1   Oct. 2, 2003

(51) Int. Cl.
*H04N 5/76*   (2006.01)

(52) U.S. Cl. .............. 348/231.99; 348/231.1; 348/231.99; 348/230.1; 348/207.1; 348/207.11; 348/552

(58) Field of Classification Search .............. 348/231.99–231.9, 207.1, 207.11, 552, 211.1, 348/211.2, 211.3, 211.5, 458, 459; 710/72–73
See application file for complete search history.

(56) References Cited

U.S. PATENT DOCUMENTS

| | | | |
|---|---|---|---|
| 5,612,733 A | 3/1997 | Flohr | |
| 5,943,603 A | 8/1999 | Parulski et al. | |
| 6,108,041 A * | 8/2000 | Faroudja et al. | 348/446 |
| 2001/0004266 A1 * | 6/2001 | Itsukaichi | 348/220 |
| 2001/0050720 A1 * | 12/2001 | Karube et al. | 348/373 |

* cited by examiner

*Primary Examiner*—David L. Ometz
*Assistant Examiner*—Anthony J. Daniels

(57) ABSTRACT

An image capture system comprises a portable computer having a software-implemented subsystem and a connection to a sensor responsive still image digital camera including a control module and a FIFO buffer for storing more than one but less than two data image frames. When the image subsystem reaches a point during reading of a frame from the buffer where it is "safe" for the next image data frame captured by the image sensor to be stored in the buffer, the subsystem issues a "continue" signal, causing the next image data frame to be stored in the buffer. The "continue" signal is only issued if the buffer has sufficient capacity for the next frame to be completely stored. The "continue" signal minimizes frame loss, optimizes memory requirement, and sensibly drops frames when the host computer cannot handle image data at the same rate they are generated.

23 Claims, 1 Drawing Sheet

Figure 1:
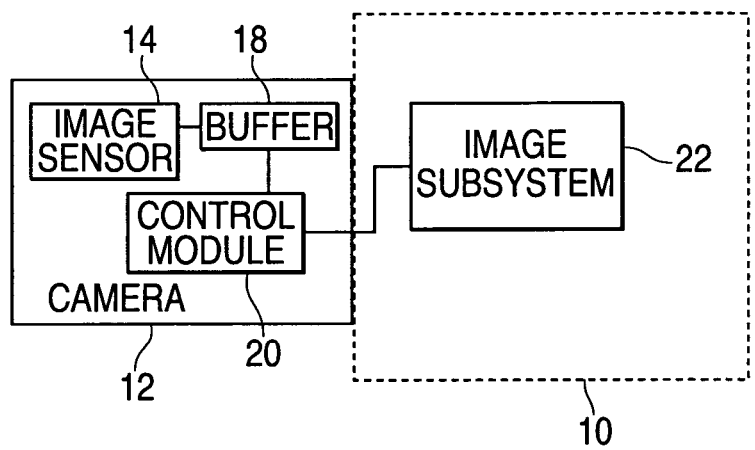

REAL-TIME IMAGE TRANSFER BY SELECTIVE FRAME DROPPING BETWEEN A CAMERA AND HOST COMPUTER

FIELD OF THE INVENTION

This invention relates generally to image capture apparatus and, more particularly, to image capture apparatus for use with personal computing apparatus, such as a portable or hand-held computing device.

BACKGROUND TO THE INVENTION

There are many different types of digital image capture devices available. For example, one of the more common types currently commercially available is a stand-alone digital camera designed to capture a single image frame into a fixed size buffer on request. Some such cameras include a display screen by means of which captured images can be reviewed. In some cases, a display screen may be provided as a viewfinder by means of which images can be viewed substantially in real time, substantially as they are received by the camera sensor. In order to provide this function, the camera requires substantial memory and image processing capability designed specifically to 'consume' image data substantially at the rate at which it is generated according to the frame rate and frame size at which the camera captures images.

There are, however, many circumstances in which it may be required to connect an image capturing device to personal computing apparatus for processing and displaying image data on its monitor. For example, U.S. Pat. No. 5,612,733 describes a video camera adapted for use with a computer monitor. The video camera is arranged to view the face of a computer operator in, for example, a video conferencing system, and the computing apparatus is arranged to process the image data captured by the camera, and transmit the data to another computer within the video conferencing system for display on its monitor.

In order to ensure that the image data can be processed or 'consumed' by the computing apparatus at a rate which minimises the level of latency (i.e. delay between the capture and display of image frames) within the system, the video camera must be provided with a certain amount of processing capability so as to compress the captured image data prior to transmission thereof to the computing apparatus, thereby minimising the rate at which it needs to be consumed. However, the provision of means within the camera for compressing the captured image data substantially increases its cost and, in many cases, its sizes.

Another known type of image capturing apparatus comprises a digital camera which can be plugged into, for example, a hand-held or portable computer for the display of captured images on its monitor or display screen. For example, U.S. Pat. No. 5,943,603 describes a camera module which is detachably coupled to a portable computer including a display screen and a data entry device. The electronic image data generated by the camera module is supplied to the portable computer for display on the display screen. Of course, the portable computer processor is not necessarily dedicated to, or even specifically designed for, the receipt and processing of the image data for display, and as such may only be able to 'consume' image data at a variable or unpredictable rate (according to processor capacity availablity) which is lower than the rate at which the image data is captured.

In some known systems, this problem is dealt with by the provision of a buffer, such as a FIFO (first-in first-out) memory module, between the camera and the host computer. The FIFO stores image data captured by the camera until it can be transmitted to for processing. In order to prevent the FIFO from overflowing (which, in turn, would lead to the uncontrolled loss of image frames), it is necessary to provide a relatively large FIFO. However, there are two main disadvantages associated with this. Firstly, the additional cost (and possibly size) which the large memory module adds to the camera. Secondly, and arguably more importantly, there is a lack of control over a FIFO memory device because once data has been written to the FIFO, it must be read back out of it (in the same order as it was written into it). Thus, if a large amount of image data has been written to the FIFO, it may take a relatively long time to read it back out, which leads to image latency such that there may be a substantial delay between the capture of image data and its display on the portable computer display screen or monitor. Even if another type of memory device is provided, thereby overcoming at least some of the problems associated specifically with a FIFO, but it would then be necessary to provide substantial processing capability within the camera head to control the memory, which would substantially increase its cost and size.

Thus, as explained above, there are several problems associated with an imaging system in which the rate of consumption of data is unpredictable. Further, today's digital image sensors provide the ability to modify the size of each frame captured in order to enhance the functionality of the device in which it is used. It is common to use this feature to provide digital zoom where each successive frame is larger or smaller than the previous, depending on the direction of zoom. However, the successive storage of multiple, variable-sized frames prior to being read by an imaging subsystem requires some extra memory element to keep track of the size of each frame stored, or an extra bit added to the width of the storage element in order to provide a unique code identifying frame separation. Both of these solutions require extra storage either in the camera head or the imaging subsystem. In fact, variable frame sizes present a significant memory management problem when trying to buffer images for use by an imaging subsystem, while still maintaining relatively low memory requirements. Further, the exposure time of the image capture device may be variable.

We have now devised an arrangement which overcomes the problems outlined above.

SUMMARY OF THE INVENTION

In accordance with the present invention, there is provided control apparatus for use with image capturing apparatus comprising an image capture device, at least one memory device of varying size for storing image sensor frames generated by the image capture device, and an image subsystem for reading image data from said memory device and for processing said read data, said control apparatus being for controlling the storage of image sensor frames of unknown size and rate into said at least one memory device before they are required by said image subsystem, the memory device having a storage capacity for more than one but less than two image sensor frames, the control apparatus being arranged to issue a signal while an image sensor frame is being read from said image capture device causing another image sensor frame to be read from said image capture device and stored in said memory device only if and when there is sufficient storage capacity available therein to store an entire image sensor frame, and to selectively drop image sensor frames from an incoming image sequence during periods when said image subsystem is unable to read the image data from the memory device at a required rate, thereby maintaining the most recent complete image in the memory device.

Also in accordance with the present invention, there is provided image capturing apparatus comprising an image capture device, at least one memory device of varying size for storing image sensor frames generated by the image capture device, an image subsystem for reading image data from said memory device and for processing said read data, and control apparatus for controlling the storage of image sensor frames of unknown size and rate into said at least one memory device before they are required by said image subsystem, the memory device having a storage capacity for more than one but less than two image sensor frames, the control apparatus being arranged to issue a signal while an image sensor frame is being read from said image capture device causing another image sensor frame to be read from said image capture device and stored in said memory device only if and when there is sufficient storage capacity available therein to store an entire image sensor frame, and to selectively drop image sensor frames from an incoming image sequence during periods when said image subsystem is unable to read the image data from the memory device at a required rate, thereby maintaining the most recent complete image in the memory device.

Also in accordance with the present invention, there is provided a method of controlling the storage of image sensor frames of unknown size and rate into at least one memory device before they are required by an image subsystem of image capturing apparatus, the method comprising the steps of issuing a signal while an image sensor frame is being read from said image capture device causing another image sensor frame to be read from said image capture device and stored in said memory device only if and when there is sufficient storage capacity available therein to store an entire image sensor frame, and selectively dropping image sensor frames from an incoming image sequence during periods when said image subsystem is unable to read the image data from the memory device at a required rate, thereby maintaining the most recent complete image in the memory device.

It will be appreciated that the apparatus and method of the present invention enables the storage or buffering of images of varying size and frequency into a limited capacity buffer, without prior knowledge of the image subsystem read rate or memory availability. The stored data will always be the most recent because of the ability to selectively drop incoming images during periods when the image subsystem is unable to maintain the sensor data rate. This also maintains synchronisation between the image capture device and the image subsystem.

Thus, by limiting the number of frames which can be stored in the memory device incorporated in a camera head, the memory device preferably being a FIFO (first-in, first-out) buffer, to less than 2, and taking advantage of the framing information provided by the sensor in the camera, it is possible to pass the responsibility of memory control to the image subsystem. It is the image subsystem, preferably implemented in software within the host computing system (so that it can be embedded into an existing system), which decides whether there is enough space in the memory device to store a second image frame in its entirety while the image subsystem is still reading the first image frame from the memory device, based on the amount of data read by the image subsystem, the size of the frame requested and knowledge of the buffer capacity. The camera head can be independent of problems which may be caused by variable frame sizes and rates and, because little processing ability is required in the camera head, it can be made very small and relatively cheap.

The image subsystem is defined as the part of the system which reads the image data from the memory device and processes the image data ready for display or storage. This part of the system could reside in the software or hardware of a host computer, or as part of the same integrated circuit that contains the control apparatus. As long as the image subsystem and the control apparatus remain separate, connected only by a 'continue' signal (see below), they could both reside in a standard digital camera, in which the image subsystem is incapable of reading data at the maximum sensor rate due to image processing tasks such as exposure, white balance, etc.

It will be appreciated that implementing storage control in this way allows the camera head to buffer incoming data with no knowledge of frame size or memory availability, while minimising the memory requirements of both the image subsystem and the camera head and removing the necessity of having to remember how many frames have been previously stored and read. In other words, if the image subsystem is reading a first frame at a sufficient rate that it frees up enough space in the buffer to store the next frame in a sequence in its entirety, then it issues a 'continue' signal and the next frame is buffered. If, however, when that next image frame has been generated, there is insufficient space in the buffer to store it completely, no 'continue' signal is issued and that frame is not buffered. In fact, the image subsystem may be reading data at such a low rate that it does not read enough of the first frame of image data to free up a whole frame's worth of buffer space until, say, the fifth frame of image data in a sequence has been generated by the image capture device, in which case, when the 'continue' signal is finally issued, it is this fifth frame which will be stored next, the second, third and fourth frames having been disregarded altogether.

It will be appreciated that the memory device or buffer may be provided in the camera head or the host computer itself. In the case where the buffer is provided in the camera head, the 'continue' signal referred to above is particularly useful in accounting for variable frame sizes (as the buffer would probably be dedicated and, as such, would be of fixed size and capacity). In the case where the buffer is in the host computer, however, the 'continue' signal is more relevant to the problems caused by variable frame rates as well as sizes because the buffer is unlikely to be dedicated to the image data processing function, and as such is likely to have a varying capacity.

As such, the image capture device, which necessarily includes an image sensor, is preferably arranged such that the image sensor generates a 'start-of-frame' (SOF) signal at the start of each captured image frame and/or and 'end-of-frame' (EOF) signal at the end of captured image frame. If, when a frame is being written to the memory device, an EOF is received to indicate that the entire frame has been written to the memory device before any of it has been written to the image subsystem (i.e, while the image subsystem is still reading the frame previously written to the buffer), the apparatus is preferably arranged to clear that unwritten frame from the buffer and to start reading the next frame in the sequence into the buffer. Thus, when the image subsystem finally gets around to reading the next frame of image data in the buffer, it will be the one most recently generated by the image capture device, thereby ensuring that the image data being read and consumed by the image subsystem is as up-to-date as possible, facilitating the substantial elimination of image latency and the 'sensible' and controlled dropping of image frames.

In a more preferred embodiment, the image sensor frame is only cleared from said memory device if and when the next SOF signal following said detected EOF signal is detected. Thus, for example, if the next frame had a long integrating period the start of the frame would be delayed, during which time the frame which would otherwise have been dropped could have been largely read.

Figure 2:
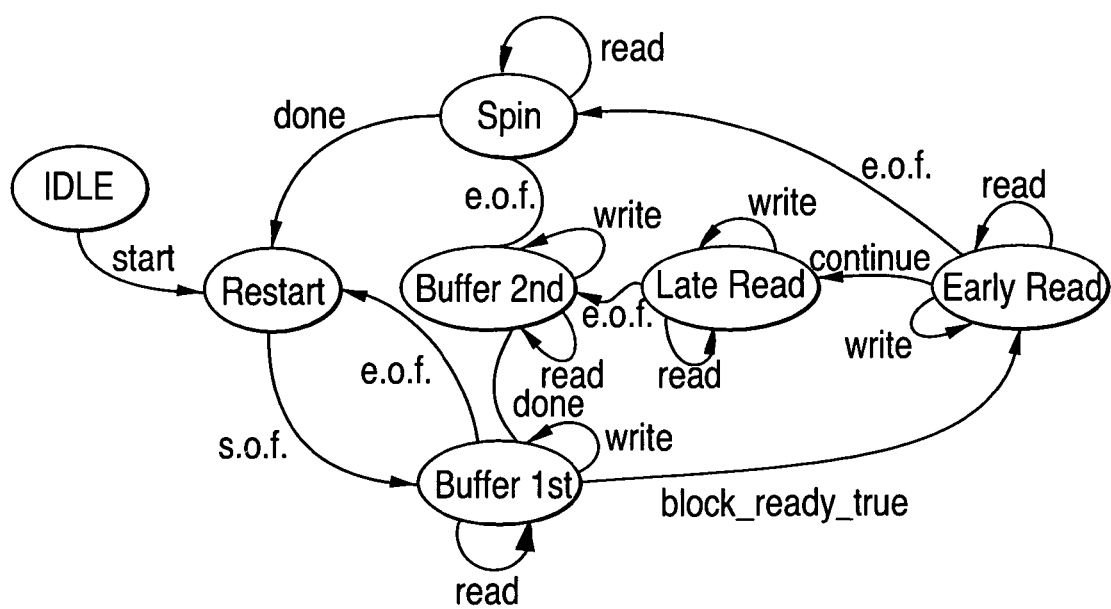

An embodiment of the present invention will now be described by way of example only and with reference to the accompanying drawings, in which:

FIG. 1 is a schematic block diagram of an image capturing system according to an exemplary embodiment of the present invention; and FIG. 2 is a state diagram illustrating the flow of data and control commands between the camera and the image subsystem of the system of FIG. 1.

Referring to FIG. 1 of the drawings, an image capture system according to an exemplary embodiment of the present invention comprises a portable computer 10 having a connection port for receiving a digital camera 12, which is adapted to capture still images on request by means of a sensor 14 through a lens (not shown). The digital camera 12 further includes a first-in, first-out (FIFO) buffer 18 and a control module 20. The portable computer 10 may be any suitable hardware device having a processor (not shown) for controlling its hardware and software operations, and will not be described in any further detail herein, except to say that it includes a software-implemented image subsystem (or image data processor) 22.

Referring to FIG. 2 of the drawings, the data transfer and control commands between the camera 12 and the image subsystem 22 take the form of a state machine, the operation of which will now be described in more detail from the point of view of the control module 20 in the camera 12.

Initially, the image subsystem 22 implemented in the host computer 10 issues a 'write' command to the control module 20 which causes an image frame to be written to the (empty) buffer 18 from the image sensor 14, usually one pixel at a time although the image data could be buffered in another buffer (not shown) and transferred to the FIFO buffer in blocks. The image sensor 14 begins a new frame with a 'start-of-frame' (SOF) signal which is included in the frame of image data read into the buffer 18 for detection by the image subsystem 22 when it starts to read data out of the buffer 18.

When the image subsystem 22 is ready to 'consume' the image data stored in the buffer 18, it issues a 'read' command which causes the buffered image frame to be read out (preferably in blocks of data of a predetermined size) from the buffer 18 to the imaging subsystem, causing a block_ready_true flag to be set.

It will be appreciated that 'consumption' of data by the image subsystem may take several forms, including saving to disc and/or sending to the screen (not shown) of the host computer 10 for display. For the purposes of this specific description, however, it will be assumed that 'consumption' takes the form of sending the image data read from the buffer 18 to the host computer screen for display so as to act as a viewfinder for the camera 12.

While the first complete image frame is stored in the buffer 18, there is insufficient storage capacity within the buffer to store another complete frame of image data. Thus, the state machine enters a 'spin' mode or state in which data captured by the image sensor 14 in the camera 12 is essentially disregarded and not read to the buffer 18. However, once the 'read' command has been issued and the image subsystem 22 has read a sufficient portion of the first image frame to free up enough buffer space to store another entire frame, the image subsystem 22 issues a 'continue' signal which causes another frame of image data to be written into the buffer 18. The next frame to be stored may, of course be the next frame of image data in the sequence if the image subsystem is reading data out of the buffer at a sufficient rate. However, in many cases, the next frame stored may be the fifth next frame of image data in the sequence, say, the second, third and fourth frames having been disregarded in the 'spin' state.

The image sensor ends each frame of captured image data with an end-of-frame (EOF) signal. If, while a frame of image data is being written into the buffer 18, and EOF signal is received before the image subsystem has started to read that frame out of the buffer, the state machine enters the 'restart' state in which that frame of image data is cleared from the buffer 18 and the next frame in the sequence is instead read into the buffer 18. If, however, the image subsystem 22 finishes reading the first frame out of the buffer before the second frame has been completely written into the buffer, the second frame becomes the new first frame and the process continues (normal operation).

The implementation of the state machine as described above ensures that two complete frames can never be stored, thus providing data that is never more than a frame old. It will also be appreciated that by detecting the SOF and EOF signals produced by the image sensor 14, it possible to limit the amount of frame storage required in the camera head to less than two frames. The flow of data into and out of the limited size buffer device is controlled, and frames are 'selectively' dropped when the image subsystem cannot read the adat at the same rate as it is produced. Further, memory control is simplified because the image subsystem decides whether there is room to buffer a second frame during the period when it is reading the same frame as is currently being buffered ('early read') which, at that point, is the only frame stored.

A summary of the main features of the above-described state machine will now be provided for reference:

'Read' command (from the image subsystem to the control module 20 in the camera 12) indicates that the image subsystem 22 is ready to read a frame of image data out of the buffer 18 for consumption as required.

'Write' command causes image data from the image sensor 14 to be written to the buffer 18.

'Done' signal (from the image subsystem 22 to the control module 20 in the camera 12) indicates that the image subsystem 22 has finished reading a complete frame of data from the buffer 18.

'Continue' signal (from the image subsystem 22 to the control module 20 in the camera 12) indicates that the image subsystem 22 has reached a point during the reading of a frame out of the buffer 18 at which it is 'safe' for the next frame of image data captured by the image sensor 14 to be stored in the buffer 18, i.e. this signal is not issued unless it is guaranteed that there will be sufficient capacity within the buffer 18 for the next frame to be completely stored. It is this 'continue' signal which is largely responsible for the achievement of minimal loss of frames, optimum memory requirement, and sensible dropping of frames when the host computer cannot read and process image data at the same rate at which it is generated. As such, it will be appreciated that the system never aborts reading a frame once it has started, irrespective of how long it takes.

'Spin' state causes the system to simply 'watch' data being captured by the image sensor 14 but not to read it into the buffer 18.

'Restart' state in which the currently stored frame of image data is 'flushed' out of the FIFO and the next frame is instead read into it. This function is only relevant in the case where newer image data is in fact available, so as to maintain the image data stored in the FIFO as current as possible. Because of the functionality of the 'continue' signal, the system never ends up trying to flush part of a frame of image data out of the buffer, which may otherwise cause problems if the host is till reading a part of an earlier frame.

There are many different circumstances in which the present invention could be used. It may be required to enter visual information while the user is on the move, in which case, the present invention provides a miniature camera which plugs into a portable computer (for example, a laptop or palmtop computer). The images captured by the camera can be displayed in real time on the screen of the portable computer to act as a viewfinder so that the user can select a scene to be captured and a capture a still image accordingly using the camera. In this case, the arrangement may also be adapted to store the captured still image in a memory device for future retrieval or review (in the form of a browser) or, for example, embed the captured image in another file, such as a 'Word' document or the like. In another embodiment, the system may be arranged to display and/or store moving images captured by the camera (in the form of video clips or the like).

In general, the present invention provides a system which maintains an optimum frame rate at which data is read by the image data processor and consumed thereby, irrespective of whether that rate is fixed or variable. It provides for the controlled dropping of some frames if the frame rate at which data is being read is substantially less than that at which it is being generated by the image capture device, thereby providing a sensible output with substantially no image latency. Finally, it minimises the memory requirement, which results in a more cost-effective and (often) more compact arrangement.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

What is claimed is:

1. Control apparatus for use with (a) image capturing apparatus including an image capture device, (b) at least one memory device of varying size for storing image sensor frames generated by the image capture device, and (c) an image subsystem for reading image data from said memory device and for processing said read data, said control apparatus being for controlling the storage of image sensor frames of unknown size and rate into said at least one memory device before they are required by said image subsystem, the memory device having a storage capacity for more than one but less than two image sensor frames, the control apparatus being arranged to issue a signal while an image sensor frame is being read from said image capture device causing another image sensor frame to be read from said image capture device and stored in said memory device only if and when there is sufficient storage capacity available therein to store an entire image sensor frame, and to selectively drop image sensor frames from an incoming image sequence during periods when said image subsystem is unable to read the image data from the memory device at a required rate, thereby maintaining the most recent complete image in the memory device.

2. Image capturing apparatus comprising an image capture device, at least one memory device of varying size for storing image sensor frames generated by the image capture device, an image subsystem for reading image data from said memory device and for processing said read data, and control apparatus for controlling the storage of image sensor frames of unknown size and rate into said at least one memory device before they are required by said image subsystem, the memory device having a storage capacity for more than one but less than two image sensor frames, the control apparatus being arranged to issue a signal while an image sensor frame is being read from said image capture device causing another image sensor frame to be read from said image capture device and stored in said memory device only if and when there is sufficient storage capacity available therein to store an entire image sensor frame, and to selectively drop image sensor frames from an incoming image sequence during periods when said image subsystem is unable to read the image data from the memory device at a required rate, thereby maintaining the most recent complete image in the memory device.

3. Apparatus according to claim 2, wherein said memory device comprises a first-in, first-out (FIFO) buffer.

4. Apparatus according to claim 2, wherein said image subsystem is implemented in software and/or hardware within a host computing system.

5. Apparatus according to claim 2, wherein said memory device is incorporated in said image capture device, or in said image subsystem.

6. Apparatus according to claim 4 wherein said host computing system comprises a connection port for receiving a corresponding connector on said image capture device.

7. Apparatus according to claim 2, wherein said image capture device is arranged to a generate a "start of frame" (SOF) signal at the start of each captured image sensor frame.

8. Apparatus according to claim 7, wherein said image capture device comprises an image sensor, and said image sensor is arranged to generate said SOF signal.

9. Apparatus according to claim 2, wherein said image capture device is arranged to generate an "end of frame" (EOF) signal at the end of each captured image sensor frame.

10. Apparatus according to claim 9, wherein said image capture device comprises an image sensor, and said image sensor is arranged to generate said EOF signal.

11. Apparatus according to claim 4, wherein said host computing system comprises a display screen and said image subsystem is arranged to read frames of image data captured by said image capture device and transfer them to said screen for display in the form of a viewfinder for said image capture device.

12. Apparatus according to claim 2, wherein said image subsystem is arranged to read frames of image data captured by said image capture device and transfer them to one or more memory devices for storage.

13. A method of controlling the storage of image sensor frames of unknown size and rate into at least one memory device before they are required by an image subsystem of image capturing apparatus, the method comprising the steps of issuing a signal while an image sensor frame is being read from said image capture device causing another image sensor frame to be read from said image capture device and stored in said memory device only if and when there is sufficient storage capacity available therein to store an entire image sensor frame, and selectively dropping image sensor frames from an incoming image sequence during periods when said image subsystem is unable to read the image data from the memory device at a required rate, thereby maintaining the most recent complete image in the memory device.

14. A method according to claim 13, including the step of generating a "start of frame" (SOF) signal at the start of each captured image sensor frame.

15. A method according to claim 13, including the step of generating an "end of frame" (EOF) signal at the end of each captured image sensor frame.

16. A method according to claim 15, including the step of detecting an EOF signal, wherein if an EOF signal is detected in connection with an image sensor frame which has been written into said memory device and if said EOF signal is detected prior to commencement of reading said image sensor frame to said image subsystem, said image sensor frame is cleared from said memory device and another frame in an image sequence is read into said memory device.

17. A method according to claim 16, wherein said image sensor frame is only cleared from said memory device if and when the next SOF signal following said detected EOF signal is detected.

18. A method according to claim 13 implemented in the form of a state machine.

19. A method according to claim 18, including a "spin" state in which image data is captured by said image capture device but is not written into said memory device.

20. A method according to claim 19, wherein said "spin" state is entered when said image subsystem is reading image data out from said memory device, but there is insufficient storage capacity therein to store another complete image sensor frame.

21. A method according to claim 18, including a "restart" state in which a complete frame of image data is cleared from said memory device and another frame of image data in a sequence is instead written into said memory device.

22. A method according to claim 21, wherein said "restart" state is entered when dropping a frame from an incoming image sequence.

23. A method according to claim 13, wherein said image subsystem issues a "done" signal when it has finished reading a complete frame of image data from said memory device.

* * * * *

UNITED STATES PATENT AND TRADEMARK OFFICE
CERTIFICATE OF CORRECTION

| | | |
|---|---|---|
| PATENT NO. | : 7,050,096 B2 | Page 1 of 1 |
| APPLICATION NO. | : 10/108982 | |
| DATED | : May 23, 2006 | |
| INVENTOR(S) | : Gary Porter et al. | |

It is certified that error appears in the above-identified patent and that said Letters Patent is hereby corrected as shown below:

In column 4, line 58, after "end of" insert -- each --.

In column 6, line 38, delete "adat" and insert -- data --, therefor.

In column 8, line 42, in Claim 7, delete "a" before "generate".

Signed and Sealed this

Thirtieth Day of June, 2009

JOHN DOLL
*Acting Director of the United States Patent and Trademark Office*